US012471593B2

(12) United States Patent
Mafra-Neto et al.

(10) Patent No.: US 12,471,593 B2
(45) Date of Patent: Nov. 18, 2025

(54) **METHODS AND COMPOSITIONS FOR CONTROLLING TOMATO LEAF MINER, *TUTA ABSOLUTA***

(71) Applicant: ISCA Technologies, Inc., Riverside, CA (US)

(72) Inventors: Agenor Mafra-Neto, Riverside, CA (US); Rodrigo Oliveira Da Silva, Riverside, CA (US); Rafael Borges, Riverside, CA (US)

(73) Assignee: ISCA Technologies, Inc., Riverside, CA (US)

( * ) Notice: Subject to any disclaimer, the term of this patent is extended or adjusted under 35 U.S.C. 154(b) by 342 days.

(21) Appl. No.: 17/930,395

(22) Filed: Sep. 7, 2022

(65) Prior Publication Data

US 2024/0081327 A1 Mar. 14, 2024

(51) Int. Cl.

*A01N 27/00* (2006.01)
*A01N 31/04* (2006.01)
*A01N 31/08* (2006.01)

(52) U.S. Cl.

CPC ............. *A01N 27/00* (2013.01); *A01N 31/04* (2013.01); *A01N 31/08* (2013.01)

(58) Field of Classification Search

None
See application file for complete search history.

(56) References Cited

U.S. PATENT DOCUMENTS

2012/0156273 A1* 6/2012 Gutsmann .............. A01N 25/28 424/405
2015/0056312 A1* 2/2015 Anderson .............. A01N 25/22 424/761

FOREIGN PATENT DOCUMENTS

WO WO-2016176618 A1 * 11/2016 ............. A01N 25/06

OTHER PUBLICATIONS

Alam, Samira B. et al. "Essential Oils as Biocides for the Control of Fungal Infections and Devastating Pest (*Tuta absoluta*) of Tomato (*Lycopersicon esculentum* Mill.)." Chem. Biodiversity, (2017), 14, e1700065. (Year: 2017).*

Mansour, Sameeh A. et al. "Toxicity of essential plant oils, in comparison with conventional insecticides, against the desert locust, Schistocerca gregaria (Forskål)." Industrial Crops and Products, (2015), 63, 92-99. (Year: 2015).*

Proffit, Magali, et al. "Attraction and Oviposition of Tuta absoluta Females in Response to Tomato Leaf Volatiles." J. Chem. Ecol., ( 2011), 37, 565-574. (Year: 2011).*

Soloway, S. B. "Naturally Occurring Insecticides." Environ. Health Perspect., (1976), 14, 109-117. (Year: 1976).*

* cited by examiner

*Primary Examiner* — David J Blanchard
*Assistant Examiner* — Kaeleigh E Olsen
(74) *Attorney, Agent, or Firm* — Benjamin Diederich

(57) ABSTRACT

Compositions and methods for affecting *Tuta absoluta*. The compositions are kairomone blends that attract male and female *Tuta absoluta*. The compositions may further include a pesticide.

12 Claims, No Drawings

METHODS AND COMPOSITIONS FOR CONTROLLING TOMATO LEAF MINER, *TUTA ABSOLUTA*

CROSS-REFERENCE TO RELATED APPLICATIONS

This application claims the benefit of U.S. Provisional Application No. 63/260,984, filed on Sep. 8, 2021, the teachings of which are expressly incorporated by reference.

STATEMENT RE: FEDERALLY SPONSORED RESEARCH/DEVELOPMENT

Not Applicable

BACKGROUND

The present disclosure relates generally to products and methods for controlling the tomato leaf miner, *Tuta absoluta*. More particularly, this present disclosure relates to methods and compositions for attracting the tomato leaf miner, for purposes of both population control and monitoring through the use of novel kairomone blends with potent and varied behavioral effects. These kairomone blends can be employed in a broad range of means, including a monolithic lure and attractant-impregnated adhesive to be deployed in monitoring traps, and a liquid formulation that can be blended with insecticide to create an attract and kill product amenable to spray application. It is also deployable in larger quantities in strategically placed, self-contained bait stations.

In general, insects of all species rely predominantly on chemicals detected in their environment for virtually every critical aspect of their lives, from females' selection of appropriate sites upon which to deposit their eggs, location of desirable habitats and food sources and the avoidance of undesirable ones, to the finding and selection of a mate. These behavior-modifying chemicals, known collectively as semiochemicals, have often been used in attempts to manage or suppress insect pest populations through a wide variety of methods, such as mating disruption (artificial treatment of a vulnerable field or environment with synthetic sex pheromone in such a way that the male insect is unable to locate a mate within that field); the placement of an attractant in a monitoring trap or as part of a mass trapping program; repellency, to drive insects away from susceptible host organisms; and attract and kill (A&K), in which an attractant is applied in combination with a killing agent, typically a small quantity of insecticide, to draw insects to a defined location and kill them before they can either reproduce or cause any damage or disease to host organisms.

*Tuta absoluta*, also known as the tomato leaf miner or South American tomato pinworm, is one of the most devastating pests of tomato crops. In the absence of control strategies the tomato leaf miner can completely destroy tomato crops. Since its origins, it has now expanded throughout the world and is considered a serious threat to tomato crops in all infested areas. Tomato is a preferred host plant for the tomato leaf miner, and it is able to lay eggs on almost every single part of the tomato plant, and can complete its life cycle feeding on leaves, stems, flowers, and fruits of the plant. Additionally, the tomato leaf miner has been known to infect and destroy other crop plants besides tomatoes.

In order to overcome these problems, various solutions have been introduced. For example, biological controls, semiochemical management, plant resistance, cultural practices, and chemical controls. However, no prior solutions have worked well, with minimal damage to the surrounding ecosystem. Furthermore, previous sexual pheromones have been limited in supply and expensive to produce, resulting in limited use. Additionally, these sexual pheromones only affect males, and have minimal to no effect on females of the species.

As such, there is a need for an economical and efficient attractant for the tomato leaf miner, that works to attract both males and females and is further capable of being used in combination with a pesticide in an attract and kill system, in lures, and in other tools to monitor, suppress, and control tomato leaf miner populations.

For monitoring purposes, this attractant could be deployed as a long-lasting monolithic lure, to be placed in virtually any type of trap, or it could be blended directly into an adhesive for a sticky trap. The attractant can also be blended with a small quantity of insecticide to create an A&K formulation. Broadly-defined, the A&K technique of pest control consists of attracting adult males, females, or both sexes of a pest species to an insect control agent (e.g., insecticide, sterilant, or insect pathogen). The insect attractant can be a chemical attractant, a visual cue, an acoustic cue, or a combination of these. A highly effective attractant and appropriate insecticide are indispensable ingredients of an effective A&K product. For such a formulation to work, insect pests must be lured to a toxicant, which they must contact and/or feed upon. Contact with the toxicant must then either kill the insect or, at minimum, result in sublethal effects that preclude that insect from effectively performing behaviors that are essential to its survival (feeding behavior, escape responses, etc.), or the survival of its population (effective courtship, mating success). The attractant must be at least as effective, if not more so, as attractants naturally present in the environment, so that the A&K formulation successfully out-competes them and lures the insect pest to the control agent. In many cases, the A&K also contains phagostimulants that induce the insect pest to consume the toxicant formulation. One way for A&K formulations to outcompete existing, natural sources of the stimuli in the treated environment, is by having point sources present at significantly higher densities than the competing natural sources, and/or by being significantly more attractive to the target pest.

Though both methods rely on chemical toxicants to suppress pest populations, A&K techniques present many advantages over cover sprays of conventional insecticides. Attract and kill typically deploys smaller amounts of toxicants, often contained within discrete point sources and coupled to a species-specific attractant, reducing the likelihood of negative environmental and non-target effects. There are also substantial economic benefits to the use of A&K over blanket pesticide sprays.

BRIEF SUMMARY

In accordance with one embodiment of the present disclosure, there is contemplated a composition for affecting *Tuta absoluta*. The composition comprises a blend of a-phellandrene; a-terpinene; limonene; P-cymene; Terpinolene; Carvacrol; and B-caryophyllene. In one particular embodiment, the composition comprises approximately 6.6% by weight a-phellandrene; approximately 7.59% by weight a-terpinene; approximately 33.3% by weight limonene; approximately 2.48% by weight P-cymene; approximately 4.39% by weight Terpinolene; approximately 0.23% by weight Carvacrol; approximately 33.86% by weight B-caryophyllene; and approximately 11.55% by weight BHT.

In certain embodiments where it is intended to kill the *Tuta absoluta* the composition may further include a pesticide. This pesticide may be any suitable pesticide, and in certain embodiments may be methomyl. One embodiment contains approximately 1% by weight methomyl.

The composition may be able to attract *Tuta absoluta*, and may further be able to attract both male and female *Tuta absoluta*.

The composition may be contained within a substrate. In particular, examples of, and methods of making, suitable substrates are recited in U.S. Pat. No. 7,887,828 titled Dual Action Organic Formulation to Control Two Stages of Insect Pests, the entirety of which is incorporated by reference herein. The substrate may, for example, be a wax emulsion, microspheres, a latex solution, hot melt glue, a resin, or plastic flakes. In the case where the substrate is a wax emulsion, it may be a wax carrier such as a paraffin wax, carnauba wax, beeswax, candelilla wax, fruit wax, lanolin, shellac wax, bayberry wax, sugar cane wax, microcrystalline wax, ozocerite, ceresin, montan wax, or combinations thereof. In a particular embodiment, the wax emulsion may include 30% by weight paraffin wax; 4% by weight soy oil; 2% by weight sorbitan monostearate; 1% by weight vitamin E; and 58% by weight distilled water. In another embodiment, the wax emulsion may include 45% by weight microcrystalline wax; 6% by weight soy oil; 3% by weight sorbitan monostearate; 1% by weight vitamin E; and 40% by weight distilled water. In yet another embodiment, the substrate may be a hot melt glue. The hot melt glue may be, for example, a polymer of ethylene-vinyl acetate, polyethylene, polypropylene, a polyamide, or a polyester.

Another embodiment of the present disclosure is directed toward methods of affecting *Tuta absoluta* populations. The method includes administering a composition to a region known or suspected to contain *Tuta absoluta*, wherein the composition includes a-phellandrene; a-terpinene; limonene; P-cymene; Terpinolene; Carvacrol; and B-caryophyllene. The method may be used to attract *Tuta absoluta*, and more particularly may attract male or female *Tuta absoluta*. The composition in this method may further include a pesticide in order to kill the *Tuta absoluta*.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

A study was conducted to evaluate the effectiveness of food attractants for capturing the tomato leaf miner in tomato plants.

Materials and Methods

First Experiment: Food Attraction for *Tuta absoluta*

The experiment was carried out in a commercial tomato plantation, growth in a staked system located in the District of Sussuanha, a rural area in the municipality of Guaraciaba do Norte, CE, Brazil. This municipality is in the Serra da Ibiapaba region, northwest of the state of Ceará, 300 km from the capital Fortaleza (latitude: 4° 10'01"S, longitude: 40° 44'52"O, altitude: 950 m).

The study was carried out over a three day period, in a 1.5 ha area of tomatoes produced in a conventional cultivation system. The experimental design used was completely randomized, with six treatments plus a control (four replications per treatment). The treatments consisted of different food attractant formulations: XF0302Ao1; XF0302Ao2; XF0302Ao3; XF0302Ao1+XF0066Ao4; XF0302Ao2+XF0066Ao4; XF0302Ao3+XF0066Ao4. In the control, water was used. In all treatments, including the control, 1% of the insecticide methomyl was added.

Each replicate consisted of a trap made from a 5-L plastic bottle with four lateral openings cut into it. A 250-mL quantity of the experimental attractant was placed at the bottom of the trap (one experimental attractant applied to each trap). Traps were randomly distributed in the production area installed in the shade at 1.0-1.2 m above the soil surface and monitored every 24 hours for 3 consecutive days.

The traps were prepared, installed, and evaluated during the experiment. The evaluation consisted of daily counts of the captured insects, especially *Tuta absoluta*, the captured insects being removed from the traps with tweezers.

Trap count data were transformed into (Qx+0.5) and subjected to analysis of variance (ANOVA) at the level of 5% probability. When significant, the means were compared with each other by the Duncan test at the 5% probability level.

Second Experiment: Food Attractants for *Tuta absoluta*

The experiment was carried out in a commercial tomato plantation, of indeterminate growth in a staked system located in the district of Sussuanha, a rural area in the municipality of Guaraciaba do Norte, CE (FIG. 04A). This municipality is in the Serra da Ibiapaba region, northwest of the state of Ceará, 300 km from the capital Fortaleza (latitude: 4° 10'01"S, longitude: 40° 44'52"O, altitude: 950 m).

The study was carried out over a three day period in a 0.85-ha area of tomatoes produced in a conventional cultivation system. The experimental design used was completely randomized, with six treatments plus a control (four replications per treatment). The treatments consisted of different food attractants formulations: XF0302Ao1; XF0302Ao2; XF0302Ao3; XF0302Ao1+XF0066Ao4; XF0302Ao2+XF0066Ao4; XF0302Ao3+XF0066Ao4. In the control, water was used. In all treatments, including the control, 1% of the insecticide methomyl was added.

Each replicate consisted of a trap made from a 5-mL plastic bottle with four lateral openings cut into it. In each trap, 250 mL of the test attractant was applied at the bottom, and traps were randomly distributed in the production area. Traps were installed in the shade 1.0-1.2 m above the soil surface and monitored every 24 hours for 3 consecutive days.

The evaluation consisted of daily counts of the captured insects, especially *Tuta absoluta*. Captured insects were removed from the traps with tweezers. Trap count data were transformed into (Qx+0.5) and subjected to analysis of variance (ANOVA) at the level of 5% probability. When significant, the means were compared with each other by the Duncan test at the 5% probability level.

Results

Tomato Plant—First Experiment

In the first 24 h after the installation of the traps, the attractant XF0302Ao1 captured the highest numbers of *Tuta absoluta* moths. The other attractants also captured adults of this species, while no *T. absoluta* individuals were captured in the control.

After 48 h, the attractants XF0302Ao1, XF0302Ao2, and XF0302Ao3 captured the most *T. absoluta* moths. The other attractants also captured adults of this species, but the XF0302Ao1+XF0066Ao4 and XF0302Ao2+XF0066Ao4 treatments did not achieve significantly higher trap capture rates than the control.

In the third and last evaluation, 72 h after the installation of the traps, XF0302Ao1 and XF0302Ao3 captured more *T absoluta* adults than any of the other treatments tested. The other attractants also captured adults of the species in smaller quantities; no *T. absoluta* moths were captured in the control.

Tomato Plant—Second Experiment

The results of this experiment showed greater collection (in absolute values) of adults on the first day of evaluation (24 h after installation). In the following days, the number of insects collected was lower due to the application of insecticides on the second and third days to control the tomato moth.

Following the same pattern as in the previous trial, in the first 24 h after the installation of the traps, the attractant XF0302Ao1 captured the most *T. absoluta* adults, while the other attractants also captured adults of this species. No *T. absoluta* moths were capture in the control.

After 48 h of the installation of the traps, the attractant XF0302Ao2 stood out. It should be noted that in the previous evaluation, it was, numerically, the second that most captured insects. The other attractants also captured adults of this species, while only one insect was captured in the control.

In the third and last evaluation, 72 h after the installation of the traps, the attractant XF0302Ao2 captured the highest number of *T. absoluta* adults. The other attractants also captured adults of this species, while control traps captured none.

Sum of the Two Evaluations

Considering the two experiments, regardless of the evaluation time, the highest average capture of the XF0302Ao1 attractant was clearly observed; XF0302Ao2; XF0302Ao3 to the detriment of these same attractants in mixture with XF0066Ao4. In this regard, we also observed captures of the target species in the control, probably because of accidental catches owing to the species casually encountering the traps.

CONCLUSIONS

In general, the attractants XF0302Ao1, XF0302Ao2, and XF0302Ao3 are effective for capturing *T. absoluta* adults, but this effectiveness is reduced when XF0066Ao4 is added to the formulation.

The composition of XF0302Ao1 is recited below in Table 1:

TABLE 1

| |
|---|
| 0.94% by weight 1-penten-3-one; |
| 11.22% by weight 3-methyl-1-butanol; |
| 5.01% by weight 2-isobuthylthiazole; |
| 2.01% by weight 6-methyl-5-hepten-2-one; |
| 0.04% by weight B-Ionone; |
| 2.90% by weight Geranylacetone; |
| 12.44% by weight Cis-3-hexen-1-ol; |
| 8.42% by weight Hexyl alcohol; |
| 7.26% by weight BHT; |
| 0.02% by weight B-damascenone; |
| 38.17% by weight Hexanal; and |
| 11.59% by weight 2-methyl-1-butanol. |

The composition of XF0302Ao2 is recited below in Table 2:

TABLE 2

| |
|---|
| 6.6% by weight a-phellandrene; |
| 7.59% by weight a-terpinene; |
| 33.3% by weight limonene; |
| 2.48% by weight P-cymene; |
| 4.39% by weight Terpinolene; |
| 0.23% by weight Carvacrol; |
| 33.86% by weight B-caryophyllene; and |
| 11.55% by weight BHT. |

A more recent experimentation repeated five times per treatment at a distance of 25 meters between treatments, with bucket traps containing 150 ml of treatment solution per trap provided the results shown below in Table 3:

TABLE 3

| Captures of *Tuta absoluta* in traps | |
|---|---|
| Monday, May 4, 2020 | 24 hours evaluation |
| Tuta Blend XF0302A02 - 1% | 176.67 ± 80.51 a |
| Tuta Pheromone - 0.1% | 181.67 ± 89.58 a |
| Water | 95.67 ± 28.01 b |
| CV % | 42.83 |
| Monday, May 11, 2020 | 48 hours evaluation |
| Tuta Blend XF0302A02 - 1% | 73.00 ± 52.72 a |
| Tuta Blend XF0302A02 - 3% | 150.00 ± 67.82 a |
| Tuta Pheromone - 0.1% | 62.67 ± 52.56 a |
| Water | 3.00 ± 2.00 b |
| CV % | 52.36 |
| Thursday, May 21, 2020 | 72 hours evaluation |
| Tuta Pheromone 0.1% + Tuta Blend XF0302A02 - 3% | 184.2 ± 21.3 ab |
| Tuta Blend XF0302A02 - 3% | 158 ± 62.4 b |
| Tuta Pheromone - 0.1% | 268 ± 132 a |
| Water | 23.8 ± 14.8 c |
| CV % | 48.46 |

Additionally, a study was conducted in April 2021, utilizing the kairomone blend XF0302Ao2 recited above, in relation to just the sex pheromone or in combination with the sex pheromone. When utilizing only the sex pheromone, 100% of the tomato leaf miners captured were males. In comparison, when XF0302Ao2 was used, 71.9% of the captured tomato leaf miners were male and 28.1% were females. When the sex pheromone and XF0302Ao2 were blended, 70.2% of the captured tomato leaf miners were male, and 29.8% were female.

The above description is given by way of example, and not limitation. Given the above disclosure, one skilled in the art could devise variations that are within the scope and spirit of the invention disclosed herein, including the use of various pesticides, traps, and application methods to achieve the same intended effect. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A composition for affecting *Tuta absoluta*, the composition comprising a substrate comprising a kairomone blend, wherein the kairomone blend contains:

approximately 6.6% by weight a-phellandrene;
approximately 7.59% by weight a-terpinene;
approximately 33.3% by weight limonene;
approximately 2.48% by weight P-cymene;
approximately 4.39% by weight Terpinolene;
approximately 0.23% by weight Carvacrol;
approximately 33.86% by weight B-caryophyllene; and
approximately 11.55% by weight BHT; wherein percent by weight is with respect to the kairomone blend.

2. The composition of claim 1 further comprising a pesticide.

3. The composition of claim 2, wherein the pesticide is methomyl.

4. The composition of claim 3, wherein the composition comprises approximately 1% by weight methomyl.

5. The composition of claim 1, wherein the composition attracts *Tuta absoluta*.

6. The composition of claim 5, wherein the composition attracts male *Tuta absoluta*.

7. The composition of claim 5, wherein the composition attracts female *Tuta absoluta*.

8. A method of affecting *Tuta absoluta* populations comprising:

administering a composition to a region known or suspected to contain *Tuta absoluta*, the composition comprising a substrate comprising a kairomone blend, wherein the kairomone blend contains:
approximately 6.6% by weight a-phellandrene;
approximately 7.59% by weight a-terpinene;
approximately 33.3% by weight limonene;
approximately 2.48% by weight P-cymene;
approximately 4.39% by weight Terpinolene;
approximately 0.23% by weight Carvacrol;
approximately 33.86% by weight B-caryophyllene; and
approximately 11.55% by weight BHT; wherein percent by weight is with respect to the kairomone blend.

9. The method of claim 8, wherein the composition attracts *Tuta absoluta*.

10. The method of claim 9, wherein the composition further comprises a pesticide.

11. The method of claim 9, wherein the composition attracts male *Tuta absoluta*.

12. The method of claim 9, wherein the composition attracts female *Tuta absoluta*.

* * * * *